United States Patent
Rahman et al.

[11] Patent Number: 5,172,329
[45] Date of Patent: Dec. 15, 1992

[54] MICROPROCESSOR-BASED DIGITAL PROTECTIVE RELAY FOR POWER TRANSFORMERS

[76] Inventors: Azizur M. Rahman, 19 Johnson Cres, St. John's, Newfoundland, Canada, A1B 2J3; Ivi Hermanto, 108 A Torbay Estate, 1 Pennylane, Rd, St. John's, Nfld, Canada, A1A 4B8; Yalla, V. V. S. Murty, 12001 Blecher Rd., Apt. #A9, Largo, Fla. 34643

[21] Appl. No.: 537,810
[22] Filed: Jun. 14, 1990
[51] Int. Cl.$^5$ .............................................. H02H 3/08
[52] U.S. Cl. .................................. 364/483; 361/35; 361/113
[58] Field of Search ............. 364/483; 361/5, 35, 361/36, 42, 44, 63, 94, 113

[56] References Cited

U.S. PATENT DOCUMENTS

| | | | |
|---|---|---|---|
| 4,354,216 | 10/1982 | Volta | 361/94 X |
| 4,429,338 | 1/1984 | Becker et al. | 361/113 X |
| 4,513,344 | 4/1985 | Usui | 361/113 |
| 4,642,564 | 2/1987 | Hurley | 364/483 |
| 4,661,877 | 4/1987 | Usui | 361/35 |
| 4,695,961 | 9/1987 | Arinobu | 364/483 |
| 4,772,978 | 9/1988 | Oura et al. | 361/36 |
| 4,951,170 | 8/1990 | Fromm | 364/483 X |
| 5,014,153 | 5/1991 | Wilkerson | 361/36 |

OTHER PUBLICATIONS

"Design and Testing of Microprocessor-Based Protective Relay for Power Transformers" Nfld, Canada A1B 3X5, Mar. 1990.
"A Stand-Alone Digital Protective Relay for Power Transformers" 89 SM 733-7 PWRD, Nfld, Canada A1B 3X5, Jul. 9, 1989.

Primary Examiner—Parshotam S. Lall
Assistant Examiner—Michael Zanelli

[57] ABSTRACT

A stand alone protective apparatus and method is provided for electrical power devices. Power devices can be damaged due to conditions for example of over current, magnetizing in rush-current, over exitation voltage, saturation, ground fault or internal faults. To protect power devices from the noted conditions, electrical current of the power device is sensed and sampled. Digital processing is used for analyzing the digitally coded sample current and based on one of the conditions that can cause damage, a signal is provided for selectively actuating, by tripping an electric/electronic circuit breaker.

17 Claims, 4 Drawing Sheets

MICROPROCESSOR-BASED DIGITAL PROTECTIVE RELAY FOR POWER TRANSFORMERS

BACKGROUND OF THE INVENTION (i) Field of the Invention

The present invention relates generally to power transformer protection, and particularly to methods and apparatuses that employ digital signal processing techniques. More particularly still, the preferred method and apparatus of the present invention are microprocessor based and utilize harmonic restraints and ground fault detection to provide reliable protection.

(ii) Description of the Prior Art

A general microprocessor based transformer monitoring system is disclosed in U.S. Pat. No. 4,654,806 granted Mar. 31, 1987 to Thomas D. Poyser et al. The system provides continuous on-line monitoring and analysis of transformer operation by monitoring various parameters related to transformer load (i.e. currents) and condition. Maximum, minimum, and instantaneous values of the parameters are stored and analyzed. To perform the analysis, a hierarchy of thresholds is associated with each parameter. When a parameter exceeds any one of the thresholds, a response is produced by the transformer monitoring system. The type of response depends on the level of the exceeded threshold in the hierarchy. The range of response produced by the transformer monitoring system includes: continuing normal periodic data collection and analysis, increasing the rate of data collection and analysis, recommending an on-site physical check of the monitored transformer, reducing transformer load, and taking the transformer off line.

A microprocessor based method for remote digital protection of distribution transformers is disclosed in U.S. Pat. No. 4,745,512 granted May 17, 1988 to John T. Hampson. The method measures and compares increases in both negative and positive phase reference currents on a distribution cable feeding a transformer and to trigger a circuit breaker to isolate the cable only if the negative sequence current increase exceeds a predetermined proportion of any simultaneous positive sequence current increase. Consequently, energizing with a 12.5% unbalance current has been found possible without false tripping. The supply parameters are sampled with a sampling period of one cycle of the supply waveform.

Yet a third computer based system is disclosed in U.S. Pat. No. 4,772,978 granted Sep. 20, 1988 to Yoshifumi Oura et al. In this transformer protection system, data of voltages and currents detected at individual terminals of a transformer connected to an electric power system are supplied to a computer. The computer computes driving point admittances of the transformer on the basis of the voltages and current data and predetermined transfer admittances of the transformer and decides that an internal fault has occurred in the transformer when the values of the driving point admittances or shunt admittances deviate from pre-set reference values, thereby disconnecting the transformer from the electric power system. Thus, in such a system physical constants of known values peculiar to the transformer being protected must be used in the computation.

The use of the second harmonic to distinguish the normal in-rush magnetizing currents from fault currents requiring protective action has been disclosed by several United States patents.

U.S. Pat. No. 2,290,101 granted Jul. 14, 1942 to Heinz Gutmann simply prevents operation of the protective differential relay from tripping in over-current cases where the second harmonic exists.

In U.S. Pat. No. 3,223,889 granted Dec. 14, 1965 to Edmund O. Schweitzer, in addition to the mere existence of the second harmonic also the phase difference between the harmonic and the fundamental must exceed a predetermined value for the protective relay to trip.

U.S. Pat. No. 4,477,854 granted Oct. 16, 1984 to Masaji Usui et al discloses a relay adapted for protection of a transformer and capable of functioning with certainty upon occurrence of any internal fault in the transformer but not functioning in the case of an inrush current which flows therein at the time of non-load energization or the like. The relay comprises a ratio differential element for comparing the amount of a suppression current with that of a differential current flowing in the transformer, an element for detecting the content proportion of a second harmonic component in the differential current, a monostable multivibrator for sending an output of a fixed pulse width at the moment of detection of the differential current, an AND circuit for producing an output in accordance with the logical product condition relative to the output of the second-harmonic detection element and that of the monostable multivibrator, a timing circuit for producing an output when the output of the second-harmonic detection element continues for a predetermined period of time, and gate means for suppressing the output of the ratio differential element when either the output of the AND circuit or that of the timing circuit is being fed thereto.

In U.S. Pat. No. 3,337,772 granted Aug. 22, 1967 to Stig Andersson, in addition to the second harmonic the fifth harmonic is used to stabilize the protection device against increase in the difference current caused by over-voltage, which causes an increase in the difference current of the fifth harmonic.

In U.S. Pat. No. 4,661,877 granted Apr. 28, 1987 to Masaji Usui, a protective relay for a transformer issues a relay tripping command when the differential current that is the difference between currents in the primary and secondary windings of the transformer has a magnitude larger that the specified value and, at the same time, when the differential current includes the fifth harmonic component less than the specified value. Another cause of tripping signal generation is the differential current value processed to have a certain timer characteristics.

SUMMARY OF THE INVENTION

The present invention endeavors to provide a comprehensive stand-alone digital protective relay system and method. In particular, it provides protection functions including percentage differential protection with second-harmonic restraint for magnetizing in-rush and a fifth-harmonic restraint for overexcitation conditions, and a separate protection for high impedance primary and secondary ground faults. More narrowly, the ground relay is also equipped with a second-harmonic restraint to prevent tripping during in-rush and through fault conditions with Current Transformer (C.T.) saturation. Hence, the ground relay is able to differentiate between a through-fault and a ground fault.

In the preferred method of the present invention the Fourier algorithm for the harmonics computation is used. However, any other relay algorithm may be used by replacing only that particular subroutine in the software. "A State-of-The-Art Review of Transformer Protection Algorithms" is a useful paper by M. A. Rahman and B. Jeyasurya published in the IEEE Transactions on Power Delivery, Vol. 3, No. 3, April 1988, and is incorporated herein by reference.

Also incorporated herein as Appendix A is a paper delivered by the inventors to the Canadian Electrical Association in Mar. 26-29, 1990 at Montreal, Quebec, Canada, detailing test results of the present protective relay system. Also incorporated here as Appendix B is a paper delivered by the inventors to the IEEE PES Summer Meeting Jul. 7-14, 1989 at Long Beach, Calif., U.S.A., detailed some test results of the present protective relay system.

Accordingly, the present invention provides a protective relay apparatus for protecting electrical, power devices from damage due to conditions of (e.g.) overcurrent, ground fault, or through-fault, by producing a signal indicative of at least one of the conditions to cause interruption of flow of electrical current to the electrical power device, comprising: electrical current sensing means; sample-and-hold means for sampling the electrical current; analog-to-digital converter means for digitally encoding the sampled current; and digital processing means for analyzing the digitally encoded current in a predetermined manner to identify at least one of the conditions and produce the signal.

In one feature of the protective relay apparatus, the former means for sensing electrical current flow through the electrical power device, and second current transformer means for sensing ground fault current in the electrical power device. The protective relay apparatus may further include low pass filter means intermediate the first and second current transformer means and the sample-and-hold means.

In another feature of the protective relay apparatus, the digital processing means comprising stored program means for storing encoded current samples provided in sequence by the analog-to-digital converter means and calculating from the stored encoded current samples differential, through, and ground fault currents sense by the first and second current transformer means.

The present invention also provides a method for protecting an electrical power device, comprising: (a) sensing electrical current flow in the power device; (b) periodically sampling current sensed in step (a); (c) digitally encoding the current sampled in step (b); (d) analyzing the digitally encoded current in a predetermined manner to determine instantaneous values of fundamental, second harmonic, and fifth harmonic components thereof; and (e) comparing the second and fifth harmonic components to the fundamental component in a predetermined manner to indicate a fault condition.

In one feature of the method for protecting an electrical power device, the method further comprises the following step between steps (c) and (d): analyzing the digitally encoded current by calculating differential, through, and ground fault currents in the electrical power device. Step (d) comprises applying a predetermined discrete fourier transform to compute the instantaneous values of fundamental, second harmonic, and fifth harmonic components. Step (e) further includes the step of incrementing fault-count associated with a predetermined fault condition when the fault condition is indicated and of resetting the fault-count when the fault condition is not indicated.

In another feature of the method for protecting the electrical power device, the method further includes the following step: (f) examining the fault-count and causing a trip signal to be sent to cause interruption of electrical power to the electrical power device when the fault-count exceeds a predetermined threshold.

BRIEF DESCRIPTION OF THE DRAWINGS

The preferred embodiment of the present invention will now be described in detail in conjunction with the attached drawing figures, in which.

DETAILED DESCRIPTION OF THE PREFERRED EMBODIMENT

Figure 1:
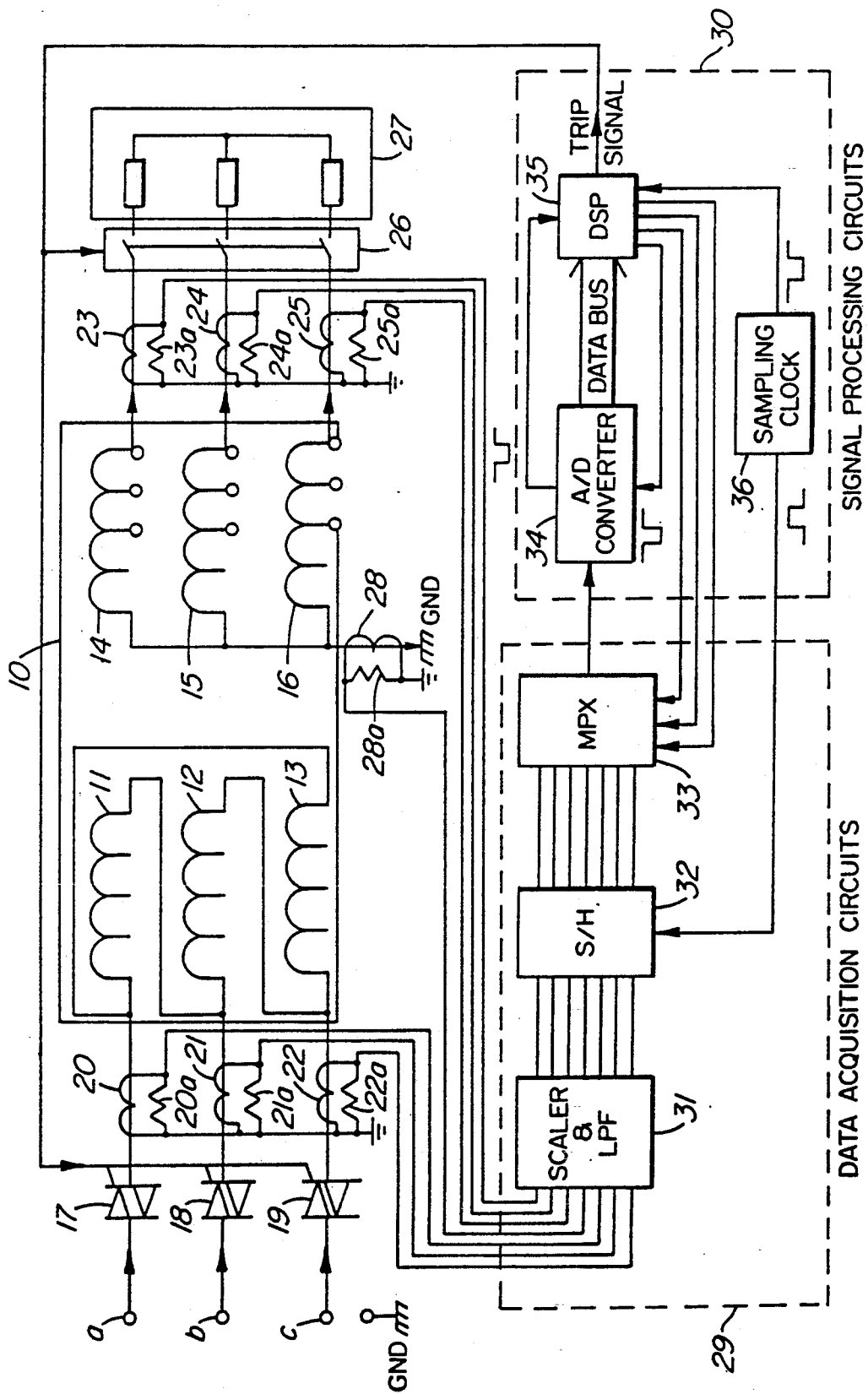
FIG. 1 is a block schematic of the apparatus of the present invention connected to the power transformer protected.

(i) Description of FIG. 1

FIG. 1 of the drawings shows the block schematic of the digital protective relay apparatus and its connection to a protected power transformer 10. By way of example, the power transformer 10 is a 5 kVA delta/star three-phase power transformer having three primary coils 11, 12, and 13 connected in a delta configuration, and having three secondary coils 14, 15, and 16 connected in a star configuration. The three primary windings 11, 12, and 13 are connected to a three-phase power source through three triac circuit breakers 17, 18, and 19 by means of input terminals a, b, and c. In order to sense the three primary currents $i_{1a}$, $i_{1b}$ and $i_{1c}$ there are three corresponding current transformers 20, 21, and 22 in a star configuration for sensing the primary currents between the triacs 17, 18, and 19 and the primary windings 11, 12, and 13. Likewise, the secondary or load currents of the secondary windings 14, 15, and 16 are sensed by three current transformers 23, 24, and 25, which are connected in a star configuration to sense the currents in the respective leads between the secondary windings and a three-pole circuit breaker 26 which connects and disconnects the secondary power to a three-phase load 27, which may of course be a remote load. Current flowing from the common point of the three secondary windings 14, 15, and 16 to the ground (GND) is sensed by a further current transformer 28. Thus, the current transformers 20, 21, 22, 23, 24, 25, and 28 provide a voltage each across shunt Resistors 20a, 21a, 22a, 23a, 24a, 25a and 28a, which is proportional to the respective current. The three secondary currents are designated $i_{2a}$, $i_{2b}$, and $i_{2c}$ and flow from the secondary windings 14, 15, and 16, respectively. The ground current sensed by current transformer 28 is designated $i_{2g}$. Up to this point the described part of FIG. 1 corresponds to conventional arrangements for power transformers and their connections.

The currents induced in the seven current transformers 20 to 25 and 28 comprise the seven inputs to data acquisition circuits 29, the output of which is processed by signal processing circuits 30 which, when necessary, outputs a trip signal to cause the triacs 17, 18, and 19, and, when so desired, the circuit breaker 26, to disconnect the input power at terminals a, b, and c to the transformer 10 (and also to disconnect the load 27), thus protecting the transformer 10 from damage due to shorts and over currents.

The data acquisition circuits 29 comprise three subcomponents, namely, a scaler and anti-aliasing low pass filter 31; a sample-and-hold circuit 32; and a multiplexer 33. The signal processing circuits 30 comprise an analog-to-digital converter 34, a digital signal processor 35, and a sampling clock 36.

Figure 2:
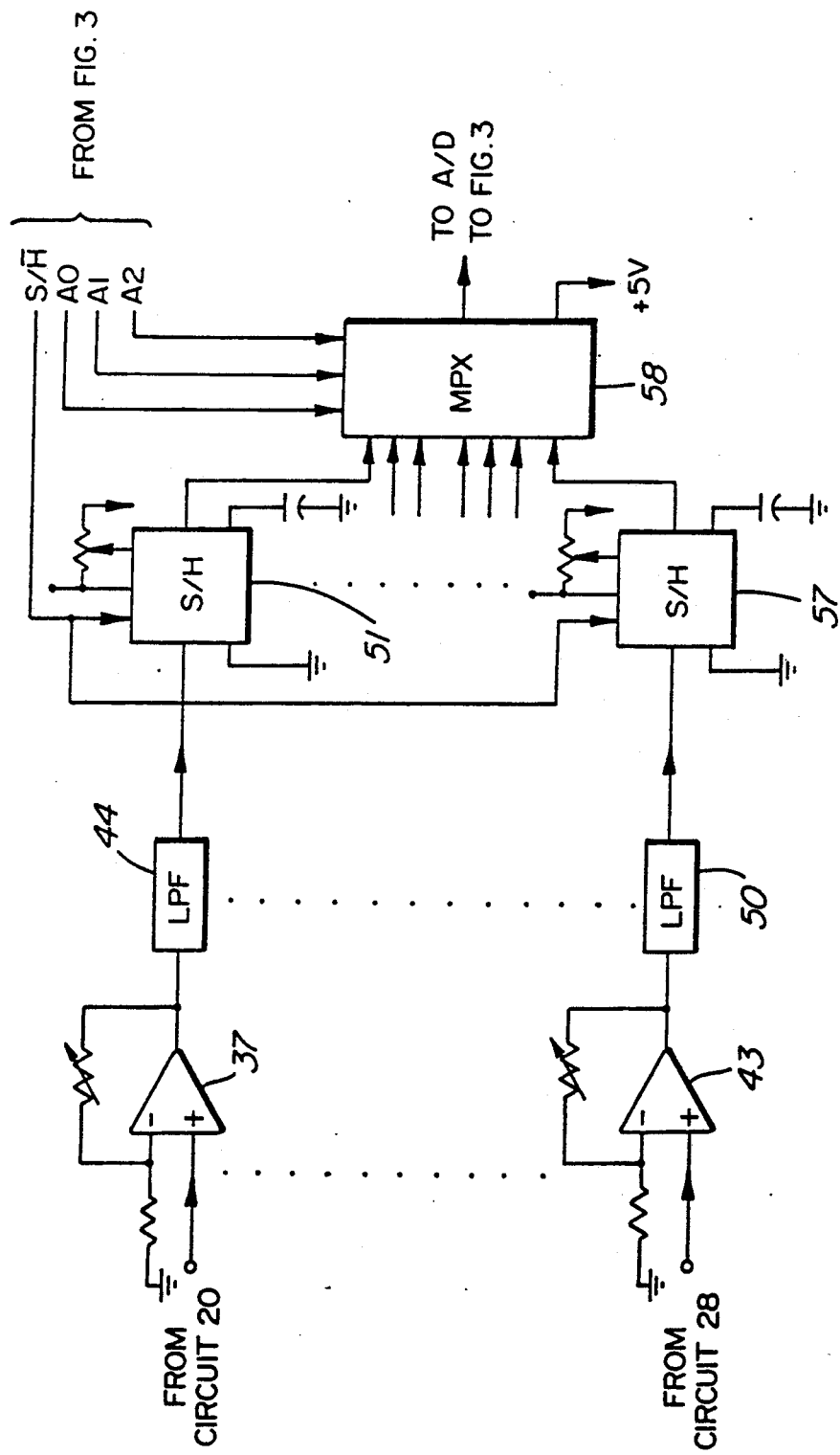
FIG. 2 is a more detailed block schematic of the data acquisition circuits shown in FIG. 1.

(ii) Description of FIG. 2

In FIG. 2 the seven analog signals from the current transformers 20 to 25 and 28 are applied each to the noninverting input of an associated operational amplifier 37 to 43, each of which is adjusted by the variable resistance thereacross to scale the current transformers signal at its input to be compatible with the analog-to-digital converter 34 which ultimately processes it, and also to compensate for any gain errors in signal paths between the seven channels in the data acquisition circuits 29. The output of each operational amplifier is applied to an anti-aliasing low pass filter 44 to 50, the output of which is applied to a corresponding sample-and-hold circuit 51 to 57. Accordingly, due to the use of the seven parallel sample-and-hold circuits 51 to 57, the corresponding three primary, three secondary, and one ground current picked-up by the current transformers 20 to 25 and 28 are sampled simultaneously during the same sampling interval. The output of the sample-and-hold circuits 51 to 57 are multiplexed in a multiplexer 58 and appear in time sequence at its output to be applied to the analog-to-digital (A/D) converter 34. The anti-aliasing low pass filter 44 to 50 is shown in detail in Appendix A FIG. 4.

Figure 3:
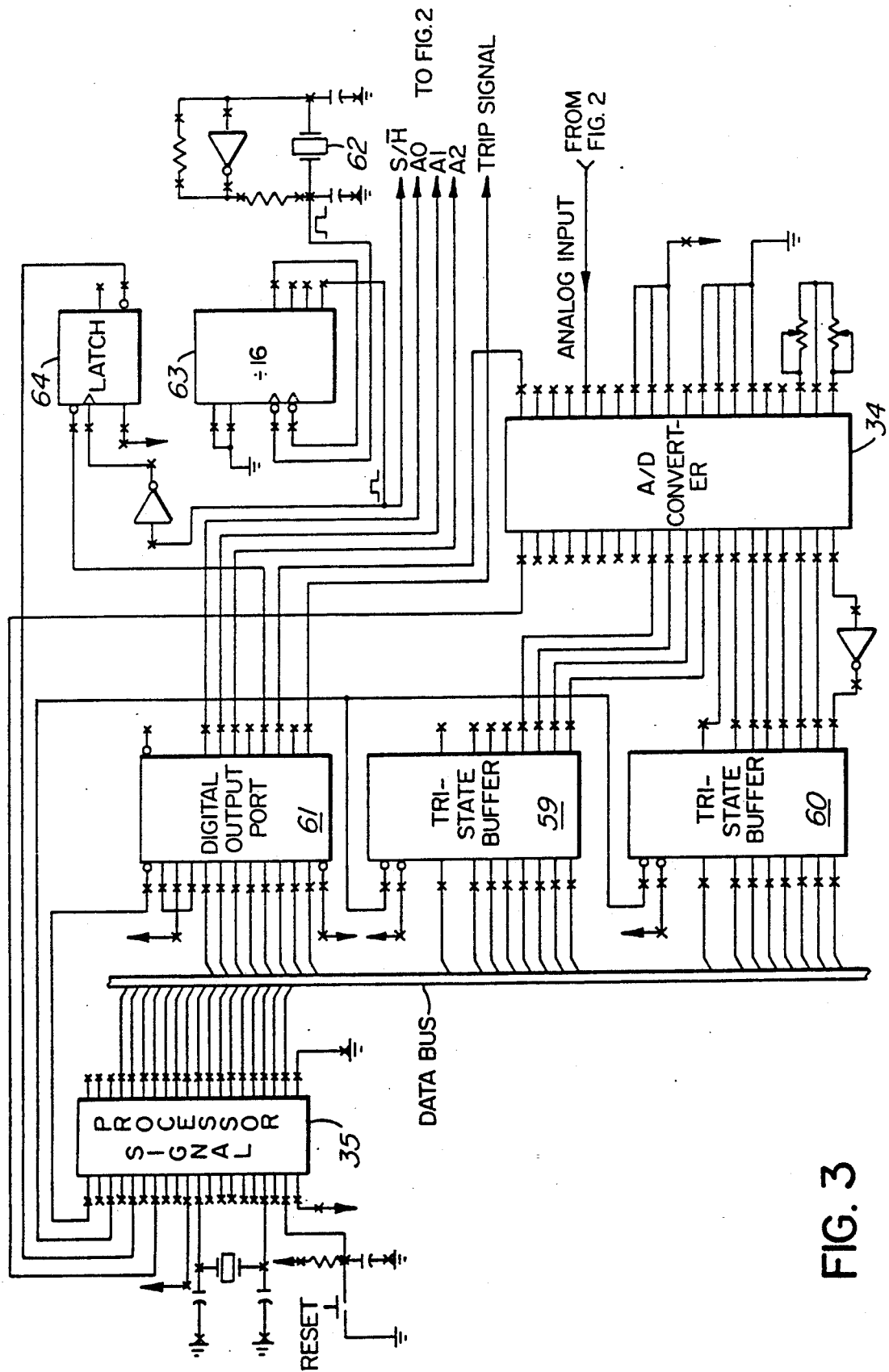
FIG. 3 is a more detailed block schematic of the signal processing circuits shown in FIG. 1.

(iii) Description of FIG. 3

Turning now to FIG. 3, the sampled analog signals supplied by the multiplexer 58 (in FIG. 2) are input to the analog-to-digital converter 34, the encoded 12-bit output of which is applied to a data bus by means of two tri-state buffers 59 and 60, which are necessary due to the fact that the A/D converter 34 is not fast enough to be interfaced directly with a digital signal processor 35. The processor 35 also interfaces its addressing and control functions by means of a digital output port 61, which supplies the three address bits A0, A1, and A2 to control the multiplexer 58. A crystal 62 oscillating at a frequency of 15.36 kHz supplies that frequency to a divider 63 which then provides the sampling clock of 960 HZ to each of the sample-and-hold circuits 51 to 57, as well as to the processor 35 via interrupt latch 64. All of the devices shown in FIG. 3 are generally well known in the art and commercially available. And while a general purpose microprocessor could be used as the signal processor 35 complex hardware would be required including multiple processors. The preferred processor 35 is a device available from Texas Instruments under Part No. TMS 320E15, which has an on-chip program memory of 4 k words and a data memory of 256 words, which is quite sufficient to implement the software shown in flow chart form in FIG. 4 without necessitating external memory use and interface.

(iv) Operation of the System

Figure 4:
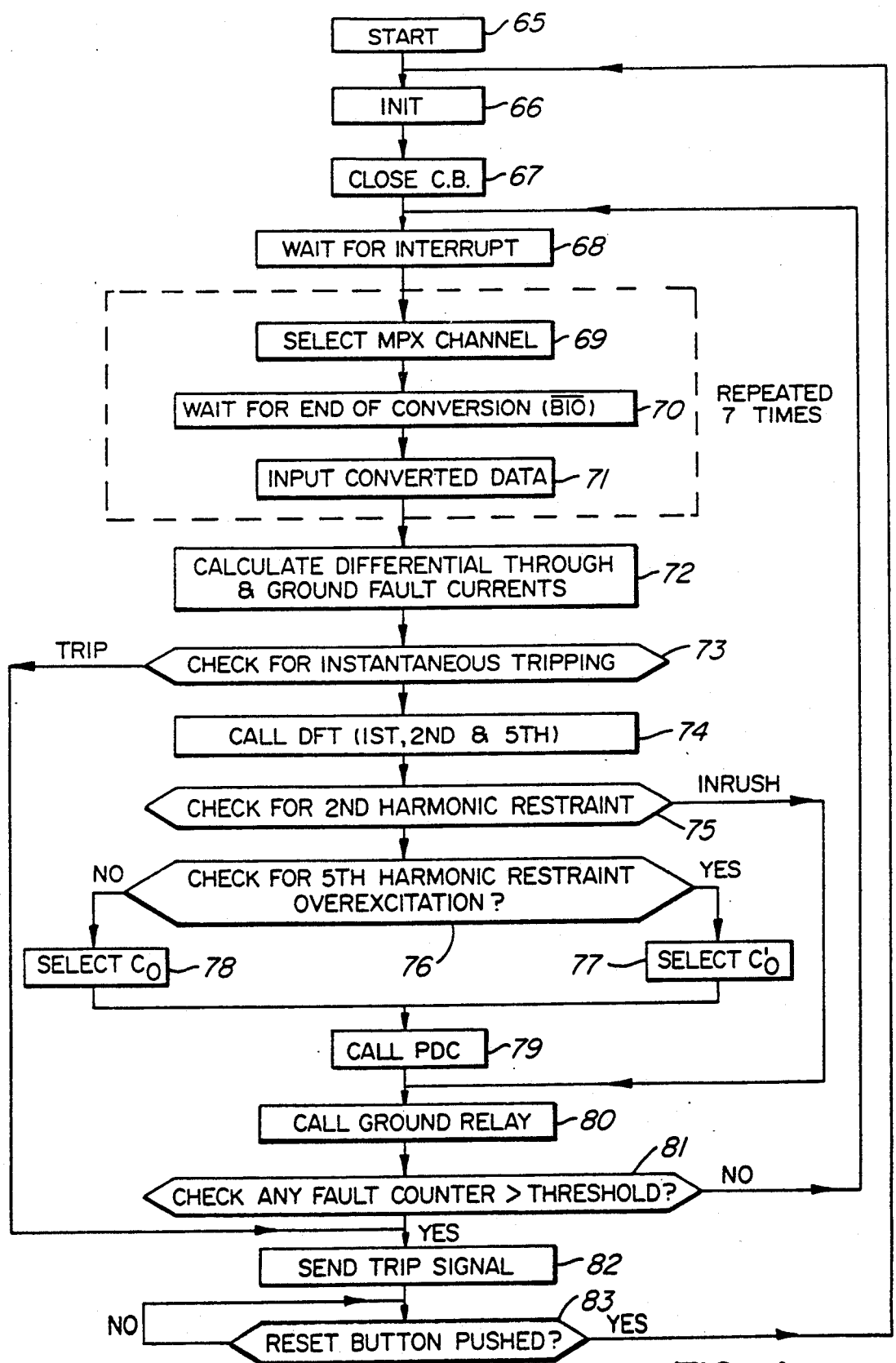
FIG. 4 is a flow-chart of the method and software implementing all the protections in the signal processing circuits shown in FIG. 3.

The operation of the system and the method of the present invention will now be described with particular reference to the flow chart of FIG. 4. At the start (65) the system is initialized (66) by the processor 35, whereupon the circuit breakers 17, 18, and 19 are closed by sending a logic "high" on the trip signal lead 67. The processor 35 then waits for an interrupt (68). At the falling edge of the sampling clock the sampled current transformer signals are held and, at the same time, the processor 35 is interrupted and selects (69) one of the seven channels via the multiplexer 58, which is then applied to the analog-to-digital converter 34. The latter, after approximately 22 microseconds, outputs the 12-bit word to be read (71) by the processor 35. These three steps (69, 70, and 71) are repeated seven times until all the held samples in the sample-and-hold circuits 51 to 57 have been applied to the A/D converter 34 and read by the processor 35. The processor 35 then calculates the differential, the through, and the ground fault currents (72). This computation is performed by the processor 35 in accordance with the three sets of formulas (1), (2), and (3) given on page 2 of Appendix A hereto. Once the calculation in step 72 is completed, the system then checks whether or not it should effect instantaneous tripping of the circuit breakers (73). A trip command is given only if any one of the differential currents calculated in step 72 exceeds, and remains above, a predetermined threshold, for two consecutive samples. If no tripping command is issued as the result of step 73 then the program proceeds and calls on the discrete Fourier transform (DFT) to compute the fundamental, the second, and the fifth harmonic components of the three differential currents determined in step 72, and computes therefrom the combined harmonic components $ID^2_1$, $ID^2_2$, and $ID^2_5$ (as per equation (6) given on page 3 of the Appendix). Having computed and stored the requisite components, the system moves to check for the second harmonic restraint (75). This is accomplished by computing the square of a threshold of 0.1767 (17.67%) times $ID^2_2$ and if this product exceeds $ID^2_1$ then an in-rush condition is declared and the program branches to call the ground relay routine in step 80. If an in-rush condition is not declared then the system proceeds to step 76 to check for the fifth harmonic restraint condition. This condition is checked by multiplying the square of a threshold of 0.125 (12.5%) by $ID^2_5$ and if the product exceeds $ID^2_1$ then an overexcitation condition is declared and a predetermined upper pick-up value $C'_o$ is selected (77), otherwise a predetermined lower value $C_o$ is selected (78). These values $C_o$ and $C'_o$ correspond to two differential current values in the percentage differential characteristic (PDC), (for example, as shown in FIG. 1 in Appendix A). The percentage differential characteristic is called (79) and is checked as follows:

No trip is declared if the fundamental primary differential current $Id^2(a,b,c)_1$ does not exceed the selected value, $C_o^2$ or $C'_o^2$ (78). If $Id^2(a,b,c)_1$ exceeds the selected value and if the fundamental through-current $I_t^2(a,b,c)_1$ does not exceed the value of $(1\ PU)^2$, then a fault is declared. On the other hand if $It^2(a,b,c)$ exceeds the value of $(1\ PU)^2$ and then if $Id^2(a,b,c)_1$ also exceeds $C^2_1 \times I^2_t(a,b,c,)_1$, no fault is declared. Otherwise a fault is declared. 1PU corresponds to the value of rated primary current of the power transformer and $C_1 = 0.125$ (12.5% slope). Thus, PDC is checked three times, one for each phase a,b, and c. If fault is declared, then the fault counter of the particular phase is incremented, otherwise it is reset.

The system then proceeds to check for the presence of any primary or secondary ground fault (80). This check is performed with a second harmonic restraint as explained above, but with a threshold of 0088 (8.8%). The reason for using the harmonic restraint in addition to threshold restraint here is that the ground relay is found to operate when the current transformers saturate during in-rush and through-fault conditions. During a through-fault, large second and higher order harmonics are present in the ground fault current, whereas during ground fault of either primary or secondary, the second and higher order harmonics are very low. Hence with this harmonic restraint, the ground relay is able to differentiate between a through-fault and a ground fault, as a result the sensitivity of the ground relay may be adjusted as desired by varying the pick-up value $C_{gf}$. If a ground fault is declared in step 80, then the program increments the corresponding fault counter, but if a ground fault is not declared, the counter is reset. The program then moves to step 81 where all the fault counters are checked to see if any one of them exceeds a preset value $T_d$ (Td=1 for the differential relay; Td=5 for the ground relay), in which case a trip signal is sent to the circuit breakers (82). After a trip signal has been issued, the system waits in a loop until the reset button is pressed (83) to restart operation. If as the result of the checking of the fault counters none exceeded the predetermined threshold $T_d$ then the program branches back into step 68 to wait for an interrupt to commence selecting the channels by means of multiplexer 58, and the cycle resumes.

Conclusion

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:

1. A stand alone protective relay apparatus for protecting an electrical power device from damage due to conditions of overcurrent, magnetizing in-rush current, over-excitation voltage, saturation, ground fault, internal faults, mismatched ratio error for external fault outside the device, current, internal fault and in-rush occurring both independently and simultaneous, said stand alone protective relay apparatus comprising:
   means for sensing electrical current;
   means for sampling and holding said electrical current;
   filtering apparatus, operatively connected to said means for sensing and said means for sampling and holding;
   analog-to-digital converter means for digitally encoding the sampled current;
   digital processing means for analyzing the digitally-encoded current to identify at least one of the said conditions; and
   digital output interruption signal-producing means for producing an actuation signal for a digital power switching device, upon the identification of at least one of the said conditions, to cause an interrupt of a flow of electrical current to said electrical power device.

2. The protective relay apparatus as defined in claim 1, said means for sensing electrical current including a first current transformer for sensing electrical current flow through said electrical power device, and a second current transformer for sensing ground fault current in said electrical power device.

3. The protective relay apparatus as defined in claim 2, wherein said filtering apparatus includes a low pass filter means operatively connected between said first and second current transformers and said means for sampling and holding.

4. The protective relay apparatus as defined in claim 3, further comprising multiplexer means operatively connected between said means for sampling and holding and said analog-to-digital converter means for applying to said analog-to-digital converter means sampled current signals in sequence.

5. The protective relay apparatus as defined in claim 4, said digital processing means comprising at least one stored program for storing encoded current samples provided in sequence by said analog-to-digital converter means and calculating from said stored encoded current samples differential, through, and ground fault currents sensed by said first and second current transformer means.

6. A method for protecting an electrical power device having an electronic/electrical circuit breaker therein, said method comprising:
   (a) sensing electrical current flow in said power device;
   (b) periodically sampling current sensed in step (a);
   (c) digitally encoding the current sampled in step (b);
   (d) analyzing the digitally encoded current in a predetermined manner to determine instantaneous values of fundamental, second harmonic, and fifth harmonic components thereof; and
   (e) comparing said second and fifth harmonic components to said fundamental component in a predetermined manner to indicate
      (i) a fault condition, and, if said fault condition is indicated, then to initiate an output trip signal to said electronic/electrical circuit breaker tripping said circuit breaker; or
      (ii) an in-rush condition and, if said in-rush condition is indicated, then to initiate an output non-trip signal or restraint signal to said electronic/electrical circuit breaker so that said circuit breaker remains open; or
      (iii) at least one of an over-excitation voltage, saturation, and ratio-error condition and, fi said condition is indicated then to initiate a tripping signal, tripping said electronic/electrical circuit breaker; or
      (iv) at least one of an over-excitation voltage saturation and ratio conditions and, if said condition is indicated then to initiate an alarm signal actuating an alarm.

7. The method for protecting an electrical power device as defined in claim 6 further comprising the following step between steps (c) and (d): analyzing the digitally encoded current by calculating differential, through, and ground fault currents in said electrical power device.

8. The method for protecting an electrical power device as defined in claim 7, wherein step (d) comprises applying a predetermined discrete fourier transform to compute said instantaneous values of fundamental, second harmonic, and fifth harmonic components.

9. A stand alone protective relay apparatus for protecting an electrical power device from damage due to conditions of overcurrent, magnetizing in-rush current, over-excitation voltage, saturation, ground fault, internal faults, mismatched ratio error for external fault outside the device, current, internal fault and in-rush occurring both independently and simultaneous, said stand alone protective relay apparatus comprising:

means for sensing electrical current;
  means for sampling and holding said electrical current;
  filtering apparatus, operatively connected to said means for sensing and said means for sampling and holding;
  analog-to-digital converter means for digitally encoding the sampled current;
  digital processing means for analyzing the digitally-encoded current to identify at least one of the said conditions; and
  digital output interruption signal-processing means for producing an actuation signal for a digital power switching device, upon the identification of at least one of the said conditions, to cause an interrupt of a flow of electric current to said electrical power device;
  wherein said signal trips an electric/electrical circuit breaker resulting in the interrupt of electrical current to said electrical power device.

10. A method of protecting an electrical power device with circuit breakers contained therein, said method comprising the steps of:

(a) actuating the power device and closing the circuit breakers;
  (b) sensing and periodically sampling current in said power device a plurality of times;
  (c) calculating the differential of through and ground fault currents;
  (d) determining after step (c) is completed, if the circuit breakers should be tripped; and
  (e) tripping said circuit breakers by giving a tripping command to said circuit breakers.

11. The method of claim 10, wherein said plurality of times in step (b) is seven.

12. The method of claim 10 wherein said tripping command is given when one of the differential currents calculated in step (c) remain above a predetermined threshold for two consecutive samples.

13. A stand alone self contained protective relay apparatus relay for protecting a transformer from damage due to conditions of overcurrent, magnetizing in-rush current, over-excitation voltage saturation, ground fault, internal faults, mismatched ratio error for external fault said protective relay comprising:

(a) data acquisition circuits for receiving and processing current from a plurality of transformers;
  (b) signal processing circuits connected to said data acquisition circuits said signal processing circuits processing signals from said data acquisition circuits for sending tripping signals; and
  (c) circuit breakers receiving said tripping signals so that current to said transformers are interrupted upon receipt of said tripping signals.

14. The protective relay apparatus according to claim 13, wherein said data acquisition circuits include:

(a) a scaler and low pass filter;
  (b) a sample and hold circuit; and
  (c) a multiplexer.

15. The protective relay apparatus of claim 14, wherein said signal processing circuit includes:

(a) an analog to digital converter;
  (b) a digital signal processor; and
  (c) a sampling clock.

16. The protective relay apparatus according to claim 15, wherein there are two tri-state buffers connected between said analog to digital converter and said signal processor.

17. The protective relay apparatus according to claim 14, wherein said scaler includes at least one operational amplifier connected to a variable resistor for adjusting the operational amplifier.

* * * * *